(12) United States Patent
Wang

(10) Patent No.: US 7,387,290 B2
(45) Date of Patent: Jun. 17, 2008

(54) SELF LOCKING AIR NOZZLE

(76) Inventor: Cheng-Chung Wang, 12F, No. 440, Sec. 4, Jen-Ai Rd., Taipei (TW)

( * ) Notice: Subject to any disclaimer, the term of this patent is extended or adjusted under 35 U.S.C. 154(b) by 208 days.

(21) Appl. No.: 11/197,831

(22) Filed: Aug. 5, 2005

(65) Prior Publication Data

US 2007/0029516 A1    Feb. 8, 2007

(51) Int. Cl.
*F16K 31/44* (2006.01)
(52) U.S. Cl. .................. 251/230; 251/339; 251/346; 251/351
(58) Field of Classification Search ................. 251/230, 251/339, 343, 344, 346, 351, 353; 137/231
See application file for complete search history.

(56) References Cited

U.S. PATENT DOCUMENTS

| | | | | |
|---|---|---|---|---|
| 4,411,287 A | * | 10/1983 | Hyde | 137/315.04 |
| 4,478,587 A | * | 10/1984 | Mackal | 441/41 |
| 5,704,397 A | * | 1/1998 | Lu | 137/630.15 |
| 6,089,251 A | * | 7/2000 | Pestel | 137/234.5 |
| 6,219,861 B1 | * | 4/2001 | Chen | 4/689 |

* cited by examiner

*Primary Examiner*—John K Fristoe, Jr.
(74) *Attorney, Agent, or Firm*—patenttm.us

(57) ABSTRACT

A self locking air nozzle for an inflatable product includes a mounting seat with a first through hole, a shoulder and a tubular extension extending from the mounting seat, a rotatable cylinder rotatably mounted on the shoulder, a driven sleeve received in the rotatable cylinder to be linearly movable relative to the rotatable cylinder, a sealing seat securely connected to the driven sleeve and selectively engaged with a bottom peripheral edge of the mounting seat so as to be linearly movable relative to the mounting seat that the sealing seat is moved to close communication between the first through hole of the mounting seat and air holes defined in a periphery of the sealing seat.

24 Claims, 23 Drawing Sheets

SELF LOCKING AIR NOZZLE

BACKGROUND OF THE INVENTION

1. Field of the Invention

The present invention relates to a self locking air nozzle, and more particularly to a self locking air nozzle embedded in an inflatable product such that after the inflatable product has been inflated, the air nozzle is able to automatically seal the intake to prevent air leakage.

2. Description of Related Art

With reference to FIGS. 15 and 15A, a conventional air nozzle is fitted to inflatable products (not shown), such as an inflatable swimming pool and animal-figured toys. The air nozzle is provided with a cap (2) rotatably received in a seat (3) and having a cylindrical extension (21) extending from a bottom of the cap (2) and a flange (22') formed on an outer periphery of the cylindrical extension (21). The seat (3) is provided with a step (31) corresponding to the flange (22') such that when the cap (2) is pressed downward and rotated, the flange (22') is engaged with the step (31) and the cap (2) is kept pushed downward by the seat (3) to accomplish an air tight objective for the air nozzle. When an air pump is to inflate the inflatable product, the operator has to rotate the cap (2) again to release the engagement between the flange (22') and the step (31) to allow an interior of the inflatable product to communicate with the ambient air outside the inflatable product. Therefore, it is very troublesome for the user to rotate the cap (2) before inflating the inflatable product and return the cap (2) after the inflatable product has been inflated. Besides, the cap (2) will protrude out of the inflatable product after the inflation of the inflatable product is finished due to the recoil force provided by the recoil spring inside the cap (2). This can be dangerous as an inflatable ball fitted with such a nozzle may injure a child due to the protruding nozzle.

To overcome the shortcomings, the present invention tends to provide an improved automatic self locking air nozzle to mitigate the aforementioned problems.

SUMMARY OF THE INVENTION

The primary objective of the present invention is to provide an improved automatic self locking air nozzle so that after the inflatable product has been inflated, the air nozzle is able to lock the intake automatically.

Another objective of the present invention is that the air nozzle of the present invention is provided with a compression spring constantly urging the sealing seat to move in a first direction so that there will be nothing protruding out of the air nozzle after the inflatable product is inflated and thus the overall appearance of the inflatable product is kept smooth.

Other objects, advantages and novel features of the invention will become more apparent from the following detailed description when taken in conjunction with the accompanying drawings.

DETAILED DESCRIPTION OF THE PREFERRED EMBODIMENT

Figure 1:
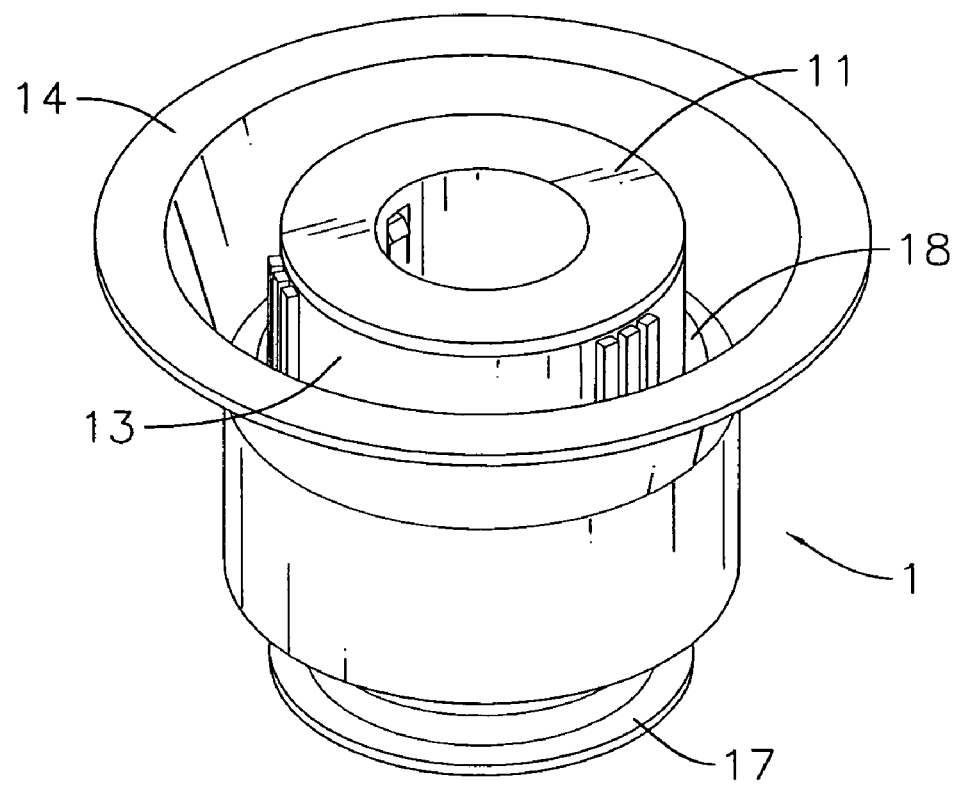
FIG. 1 is a perspective view of an air nozzle of the present invention.
Figure 2:
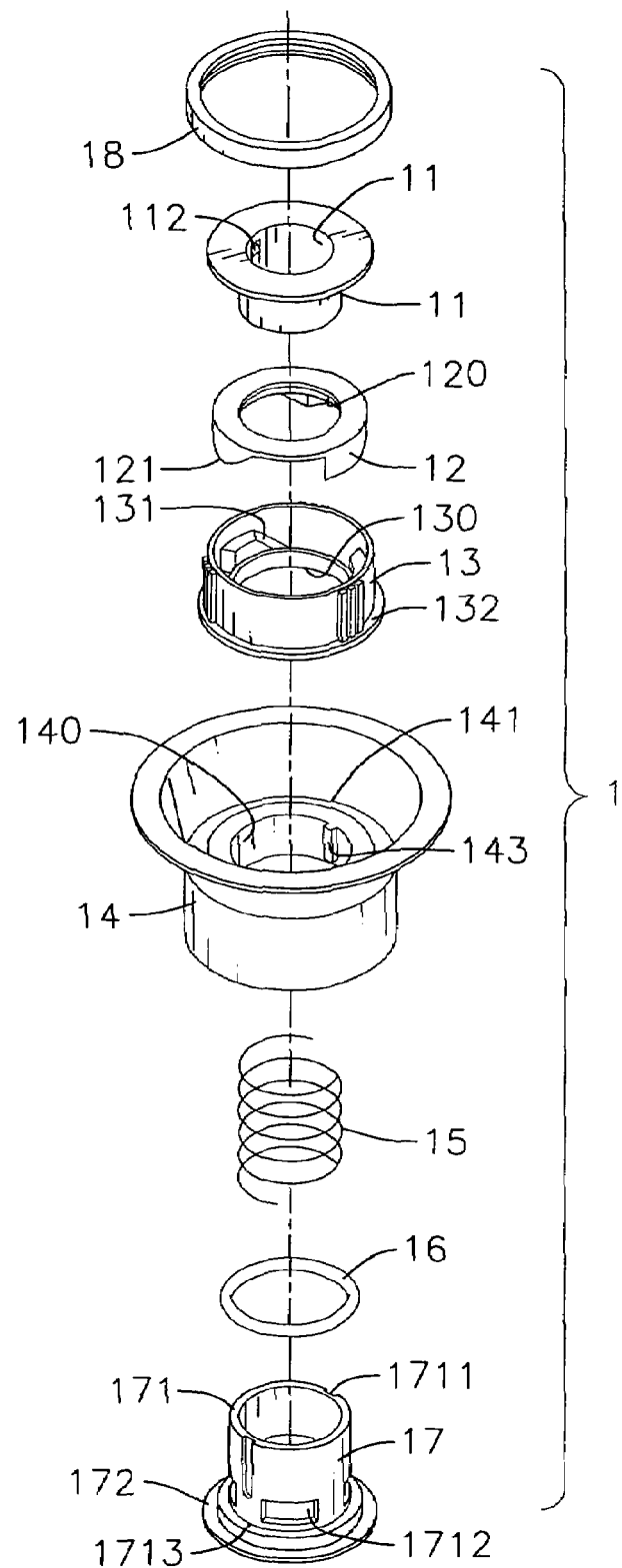
FIG. 2 is an exploded perspective view of the air nozzle of the present invention.

With reference to FIGS. 1 and 2, the self locking air nozzle (1) in accordance with the present invention includes a rotatable collar (11), a driven sleeve (12), a rotatable cylinder (13), a mounting seat (14), a compression spring (15), a sealing ring (16), a sealing seat (17) and a fixture (18).

Figure 2A:
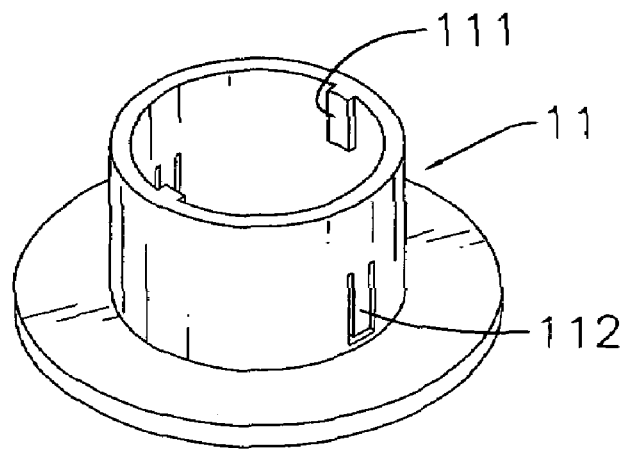
FIG. 2A is a perspective view of the rotatable collar in an angle different from that shown in FIG. 2.

The rotatable collar (11) is composed of a cylindrical extension and a disk integrally formed on a distal end of the cylindrical extension. The rotatable collar (11) has a centrally defined first through hole (110) defined through the rotatable collar (11), first bosses (111) (as shown in FIG. 2A) formed on a bottom portion of an inner periphery defining the first through hole (110) and second bosses (112) formed on a mediate portion of the inner periphery of the first through hole (110).

Figure 2B:
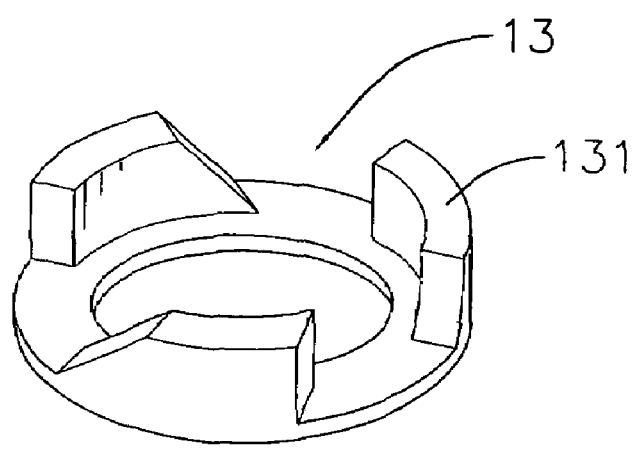
FIG. 2B is a perspective view of the rotatable cylinder in an angle different from that shown in FIG. 2.

The driven sleeve (12) is provided with a second through hole (120) and multiple first wedges (121) intermittently formed on and extending from a bottom of the driven sleeve (12). The rotatable cylinder (13) is a hollow cylindrical tube-like element and has two open ends, a third through hole (130), multiple intermittent second wedges (131) (as shown in FIG. 2B) formed on an inner periphery defining the third through hole (130) and a first flange (132) formed on a bottom portion of an outer periphery of the rotatable cylinder (13).

The mounting seat (14) is a cylindrical element and has a fourth through hole (140) defined through the mounting seat (14), a shoulder (141) formed on an inner periphery defining the fourth through hole (140) to correspond to the first flange (132) of the rotatable cylinder (13), a tubular extension (142) extending downward from a bottom of the mounting seat (14) with the fourth through hole (140) extending through the tubular extension (142) and guiding ribs (143) formed on an inner periphery defining the fourth through hole (140).

The sealing seat (17) is composed of a hollow cylindrical column (171) and a cap (172) formed on a bottom of the cylindrical column (171). The cylindrical column (171) has guiding recesses (1711) defined in an outer periphery of the cylindrical column (171), air holes (1712) defined through a bottom portion of the cylindrical column (171) and a second flange (1713) formed on a joint between the cylindrical column (171) and the cap (172).

Figure 3:
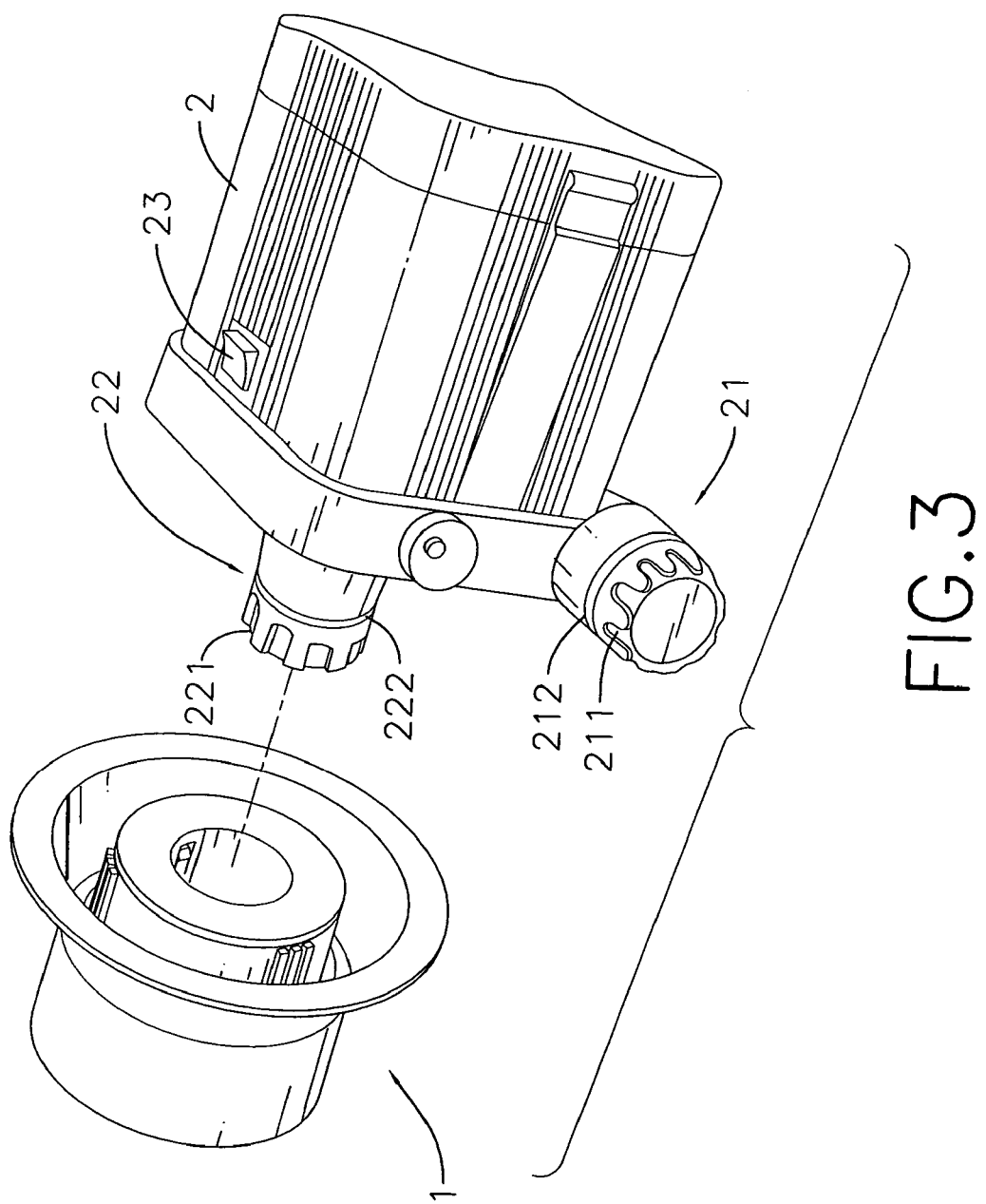
FIG. 3 is a perspective view showing that an air pump is used with the air nozzle of the present invention.

With reference to FIG. 3, it is noted that the air nozzle of the present invention is used with an air pump (2) having an inlet (21) and an outlet (22). The inlet (21) is provided with multiple first limiting recesses (211) defined in an outer periphery of the inlet and a first circular concavity (212) defined around the inlet (21). The outlet (22) is provided with multiple second limiting recesses (221) defined in an outer periphery of the outlet (22) to correspond to the second bosses (112) of the rotatable collar (11) and a second circular concavity (222).

Figure 4A:
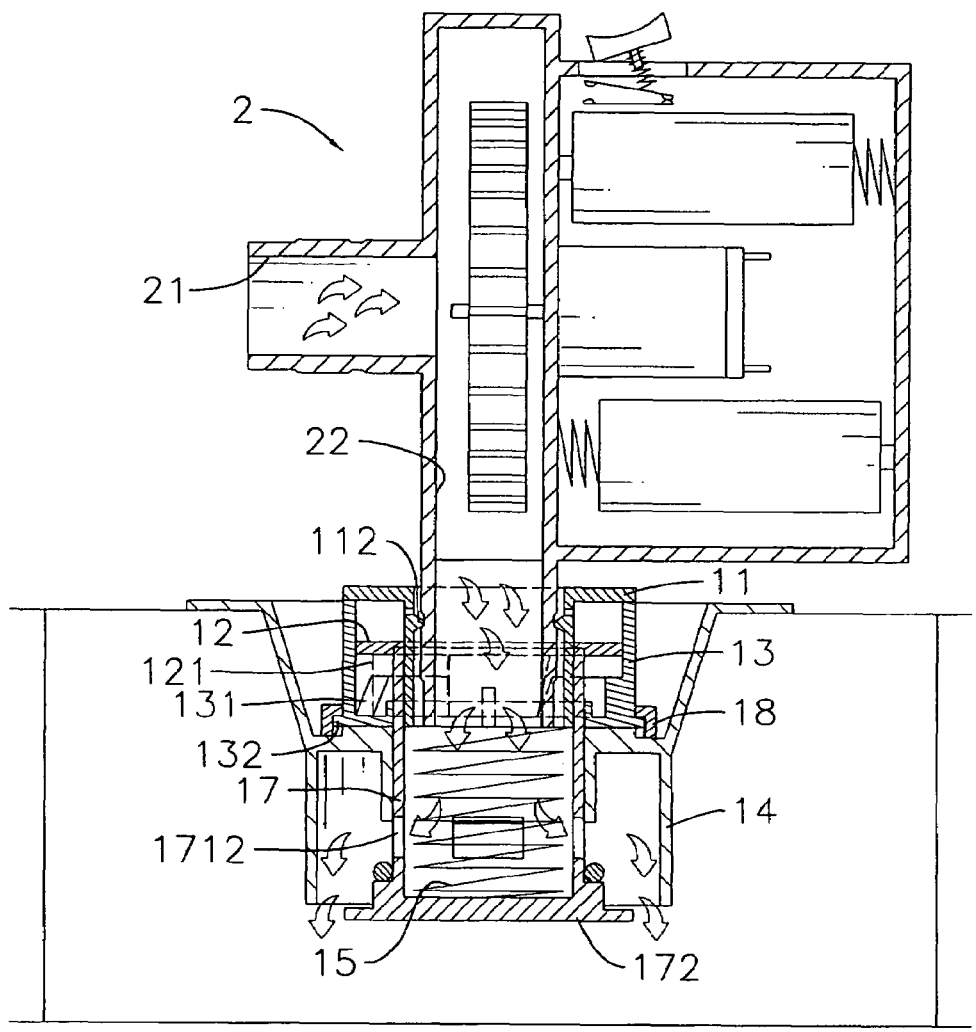
FIG. 4A is a schematic cross sectional view showing that after the air pump is inserted into the air nozzle, the sealing seat is pushed away by the rotatable cylinder from engagement with the mounting seat to open an air channel for allowing air to flow into the inflatable object.
Figure 4B:
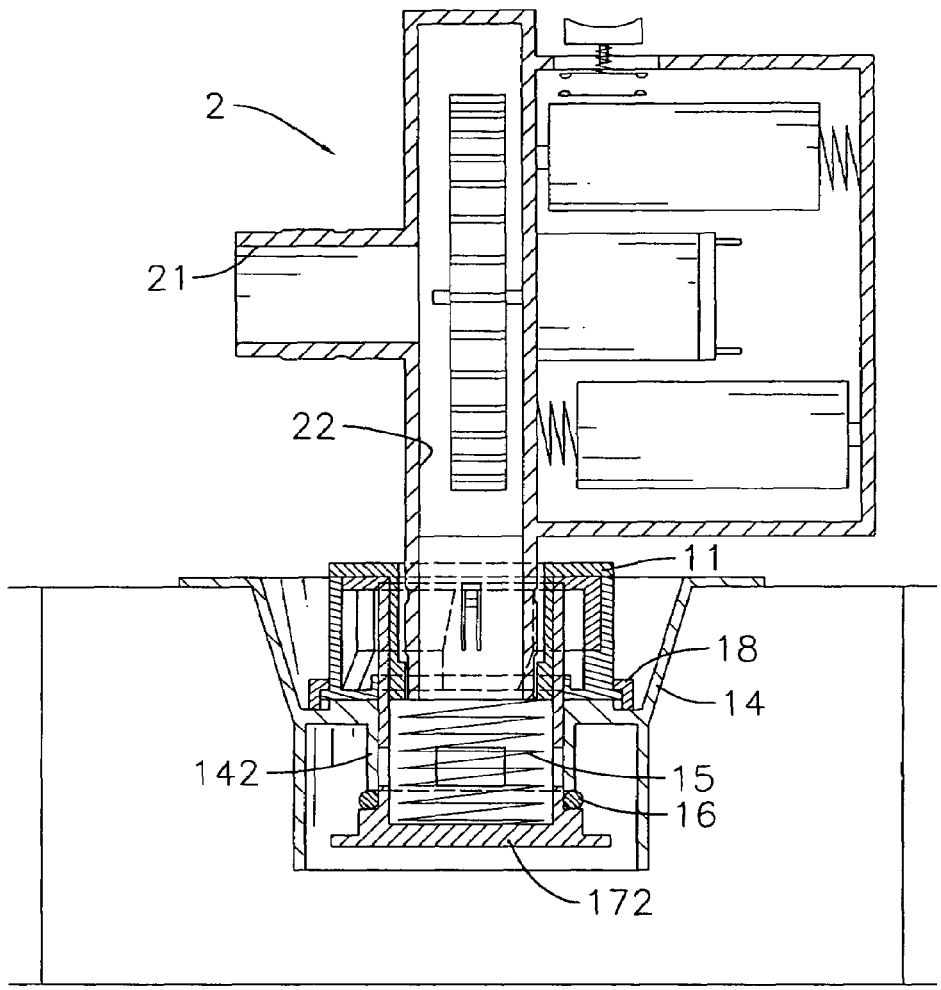
FIG. 4B is a schematic cross sectional view showing that after the inflatable object is inflated, the rotation of the air pump as well as the rotatable collar activates an upward movement of the sealing seat relative to the rotatable collar so seal the air channel in an airtight manner.

With reference to FIGS. 4A and 4B, it is noted that after the assembly of the air nozzle of the present invention, the driven sleeve (12) is movably received in the rotatable cylinder (13) with the first wedges (121) engaging with the second wedges (131). Then the rotatable collar (11) is securely engaged with the rotatable cylinder (13) with a top peripheral edge of the rotatable cylinder (13) securely engaged with an inner periphery defining the second through hole (120). Due to the second through hole (120) of the driven sleeve (12), after the secure engagement between the rotatable collar (11) and the rotatable cylinder (13), the driven sleeve (12) can still move freely inside the rotatable cylinder (13). Thereafter the fixture (18) is applied to secure engagement between the first flange (132) and the shoulder (141) of the mounting seat (14).

The cylindrical column (171) is extended through the fourth through hole (140) of the mounting seat (14) to be securely engaged with the driven sleeve (12) with the guiding ribs (143) slidably received in the guiding recesses (1711) of the cylindrical column (171). The compression spring (15) is sandwiched between the cap (172) and the rotatable collar (11) and the sealing ring (16) is securely rested on the second flange (1713) to be selectively engaged with a bottom peripheral edge of the tubular extension (142) of the mounting seat (14) so as to accomplish the closure of the fourth through hole (140) via the cap (172).

It is noted that before the air pump (2) is inserted into the rotatable collar (11), the first wedges (121) are engaged with the second wedges (131). Then after the outlet (22) of the air pump (2) as shown in FIG. 3 is inserted into the first through hole (110) of the rotatable collar (11) to have the second bosses (112) received in the second limiting recesses (221), rotation of the air pump (2) results in that the rotatable collar (11) is rotated accordingly. However, because the rotatable collar (11) is securely connected to the rotatable cylinder (13), the rotatable cylinder (13) is also rotated. After the rotation of the rotatable cylinder (13), the first wedges (121) fall into corresponding gaps between two adjacent second wedges (131) due to a recoil force stored in the compression spring (15). As a consequence, the cap (172) leaves the engagement with the peripheral edge of the tubular extension (142) and thus air entering from the inlet (21) and flowing out of the outlet (22) of the air pump (2) is able to flow through the first through hole (110), the second through hole (120), the third through hole (130), the fourth through hole (140) and the air holes (1721) of the sealing seat (17) to enter the inflatable object (not shown).

After the inflation of the inflatable object is finished, the air pump (2) is rotated again to return to its original position, i.e. the second limiting recesses (221) are away from the second bosses (112) of the rotatable collar (11). After the rotation of the air pump (2), the rotatable collar (11) as well as the rotatable cylinder (13) is also rotated, which results in the engagement between the first wedges (121) and the second wedges (131) again. That is, the sealing seat (17) will be pulled upward relative to the mounting seat (14). As a consequence, the sealing ring (16) is engaged with the peripheral edge of the tubular extension (142) to accomplish an airtight engagement between the sealing seat (17) and the mounting seat (14).

Figure 5A:
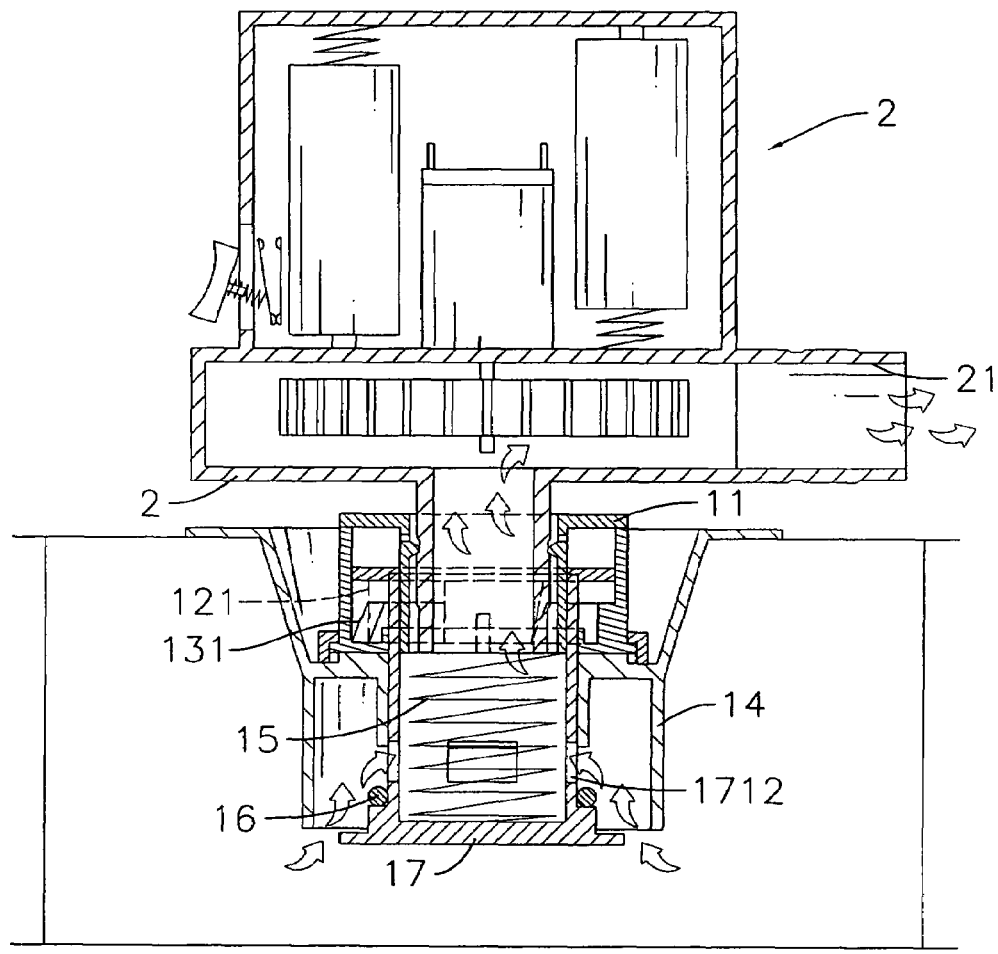
FIG. 5A is a schematic cross sectional view showing the air discharge initiated by the insertion and rotation of the air pump.
Figure 5B:
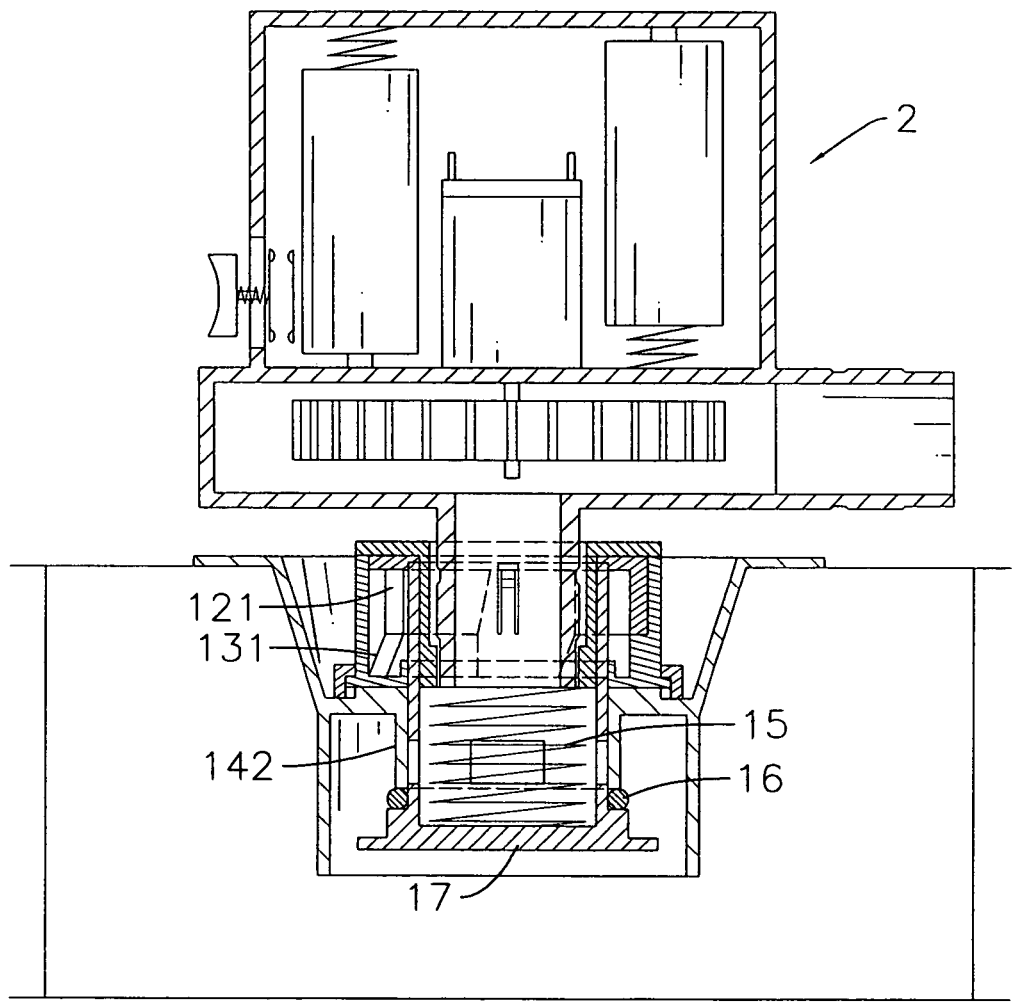
FIG. 5B is a schematic cross sectional view showing the structure of the air nozzle of the present invention after the air discharge process is finished.

With reference to FIGS. 5A and 5B, when air discharge of the inflatable object is required, the operator is able to insert the inlet (21) into the rotatable collar (11) to have the second bosses (112) received in the corresponding second limiting recesses (221). Then rotation of the air pump (2) will cause the rotatable collar (11) as well as the rotatable cylinder (13) to rotate, which is the reason to cause the sealing seat (17) to leave the engagement with the tubular extension (142) of the mounting seat (14). Thus air within the inflatable object is able to escape the inflatable object from the air holes (1712), the fourth through hole (140), the third through hole (130), the second through hole (120), the first through hole (110) and into the inlet (21) of the air pump (2). Because the outlet (22) communicates with the ambient air, the air flowing from the inflatable object and into the inlet (21) is able to escape from the inflatable object.

After air discharge is finished, the operator is able to rotate the air pump (2) again to return it the original position. As described earlier, when the air pump (2) is rotated to its original position, the first wedges (121) and the second wedges (131) are engaged with each other so that the sealing seat (17) is pulled upward relative to the mounting seat (14). Thus the sealing seat (17) is engaged with the bottom peripheral edge of the tubular extension (142) of the mounting seat (14) so as to close communication between the air holes (1712) and the ambient air. Thus airtight engagement of the air nozzle to the inflatable object is once again accomplished.

Figure 6:
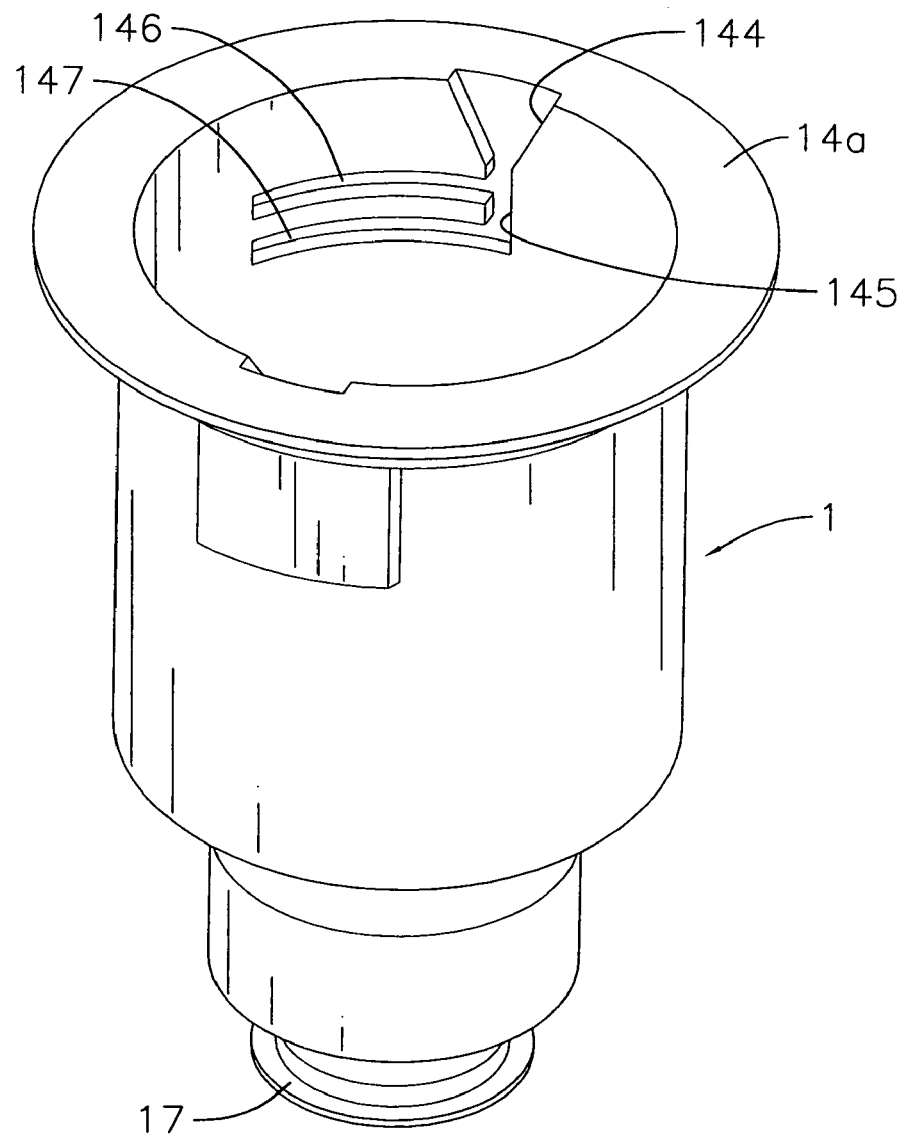
FIG. 6 is a perspective view of a different embodiment of the air nozzle of the present invention.
Figure 7:
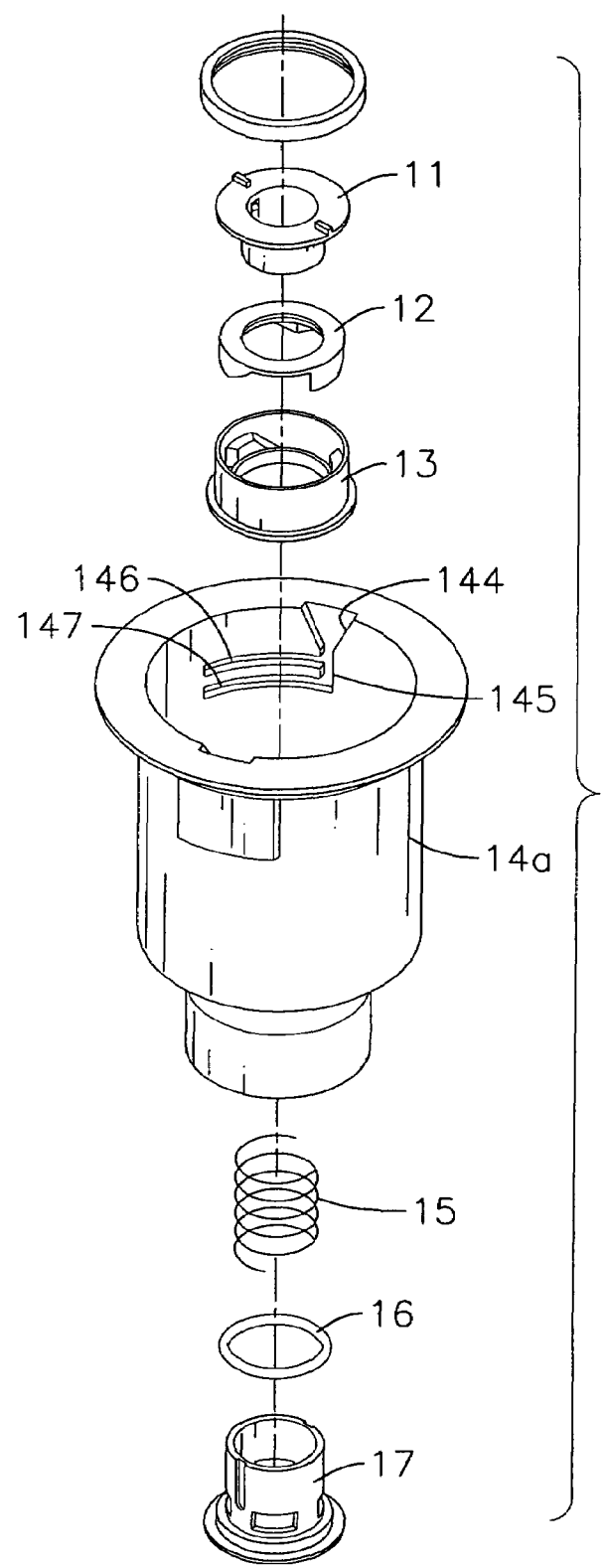
FIG. 7 is an exploded perspective view of the air nozzle in FIG. 6.

With reference to FIGS. 6 and 7, the air nozzle (1) in accordance with the present invention includes a rotatable collar (11), a driven sleeve (12), a rotatable cylinder (13), a mounting seat (14a), a compression spring (15), a sealing ring (16), a sealing seat (17) and a fixture (18). Except the mounting seat (14a), the rest of the elements are substantially the same as previously described. Thus, detailed description thereof is omitted.

It is noted that the mounting seat (14a) is further provided with a groove (144), a path (145) in communication with the groove (144), a first passage (146) and a second passage (147). The first passage (146) and the second passage (147) are communicated with and vertical to the path (145).

Figure 8A:
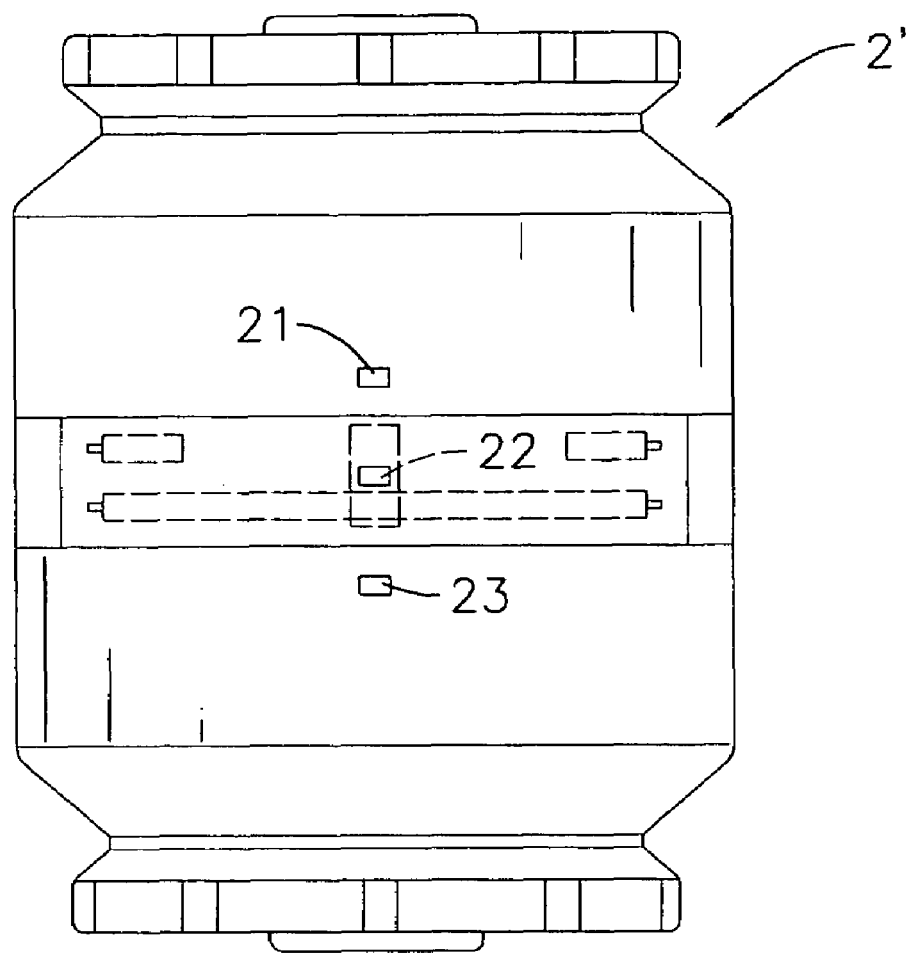
FIG. 8A is a schematic side plan view of an air pump corresponding to the air nozzle of the present invention in FIG. 6.
Figure 8B:
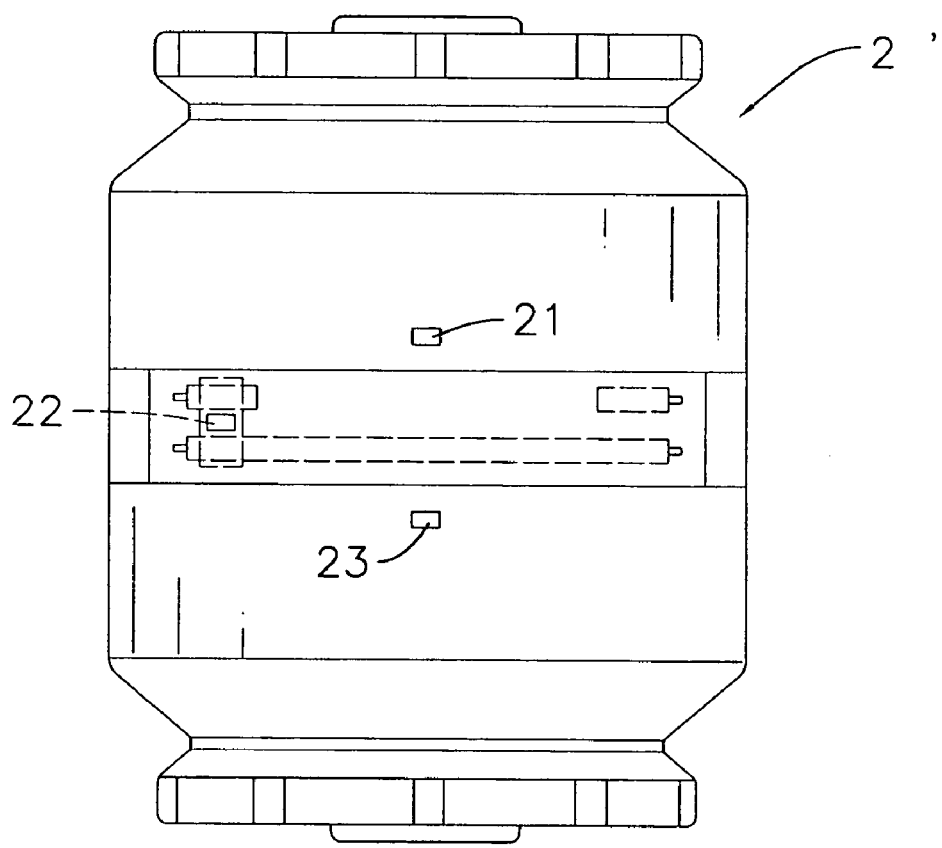
FIG. 8B is a schematic side plan view showing that switches of the air pump in FIG. 8A are able to move to activate the air pump.
Figure 9A:
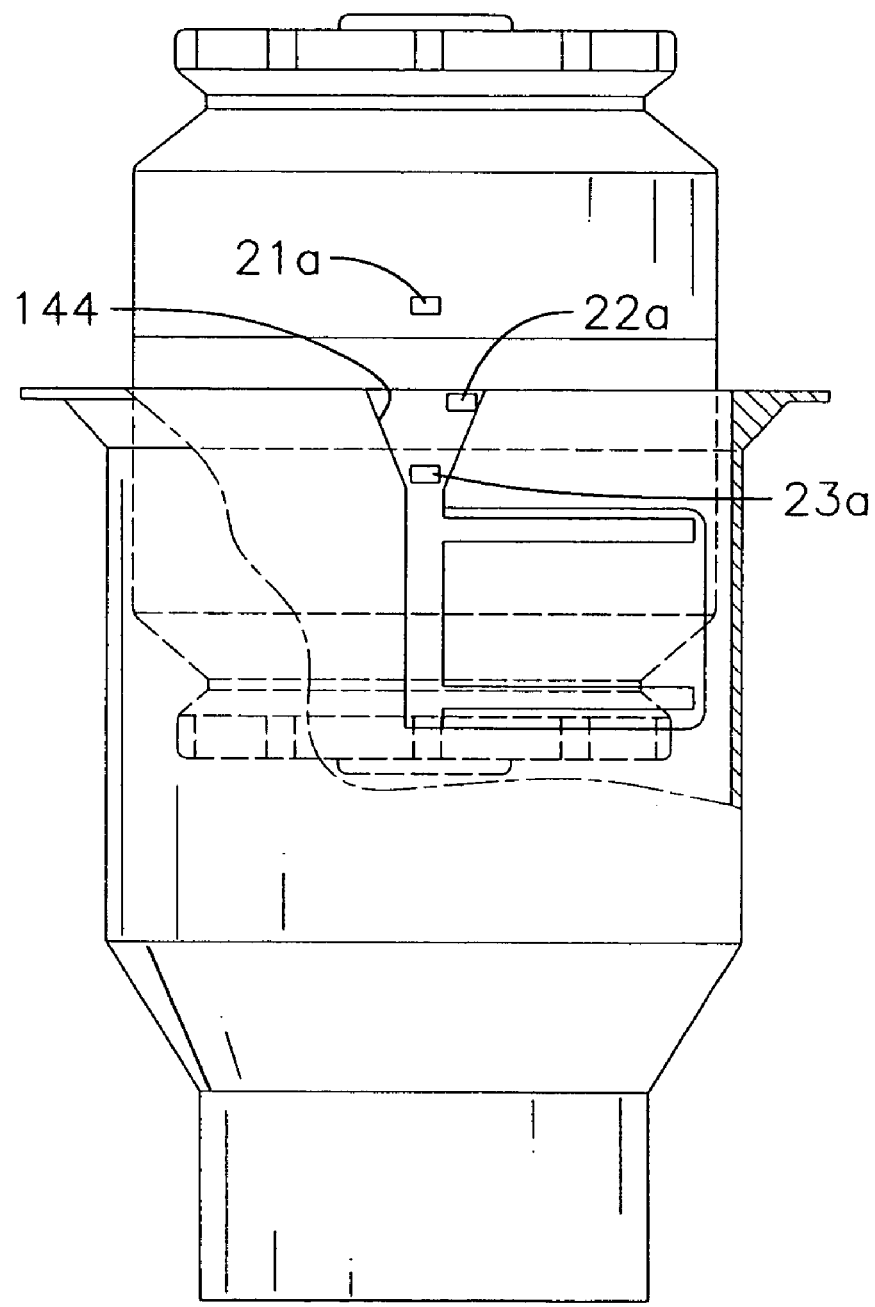
FIGS. 9A to 9D are schematic side plan views showing that the switches are moved due to the introduction of the guiding recess in the mounting seat.
Figure 9B:
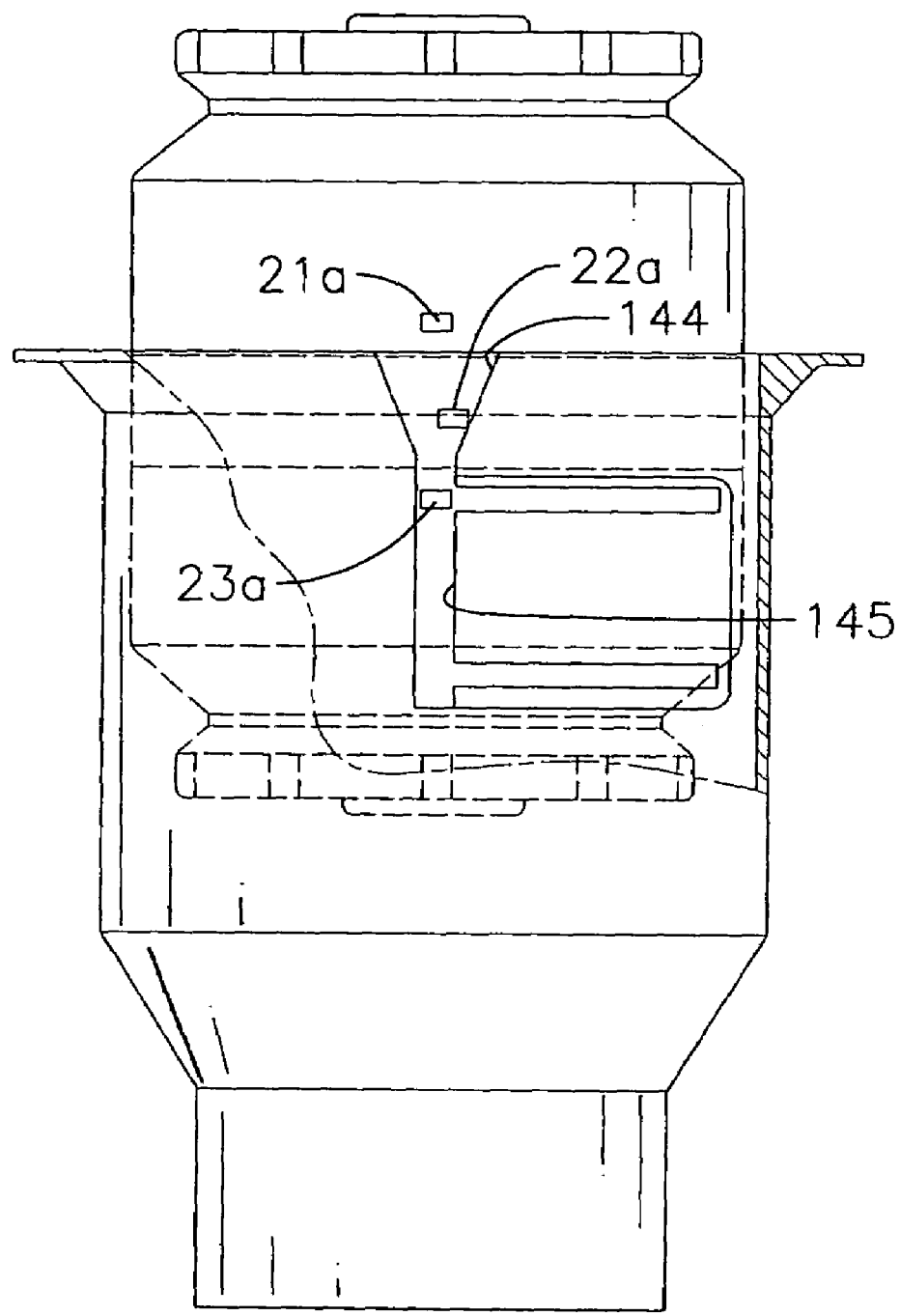
Figure 9C:
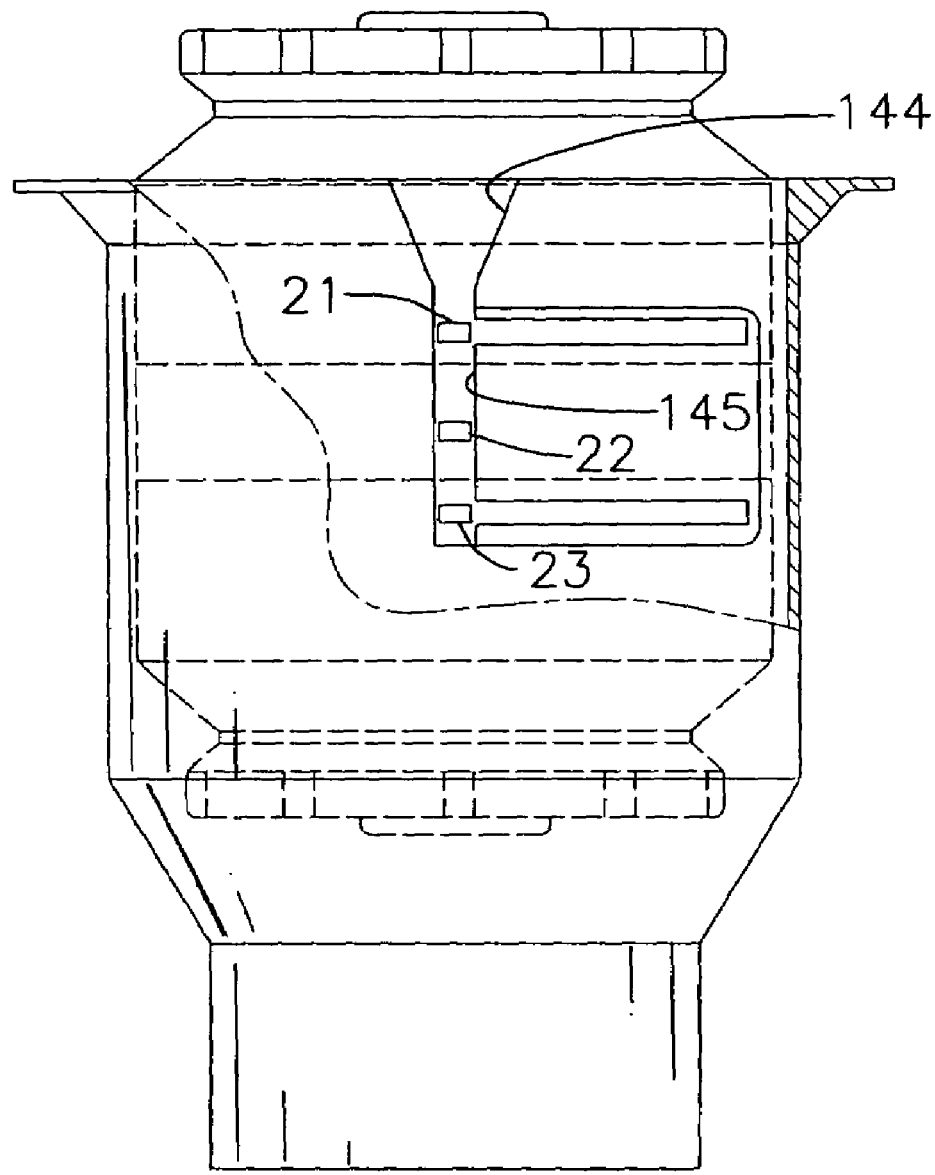
Figure 9D:
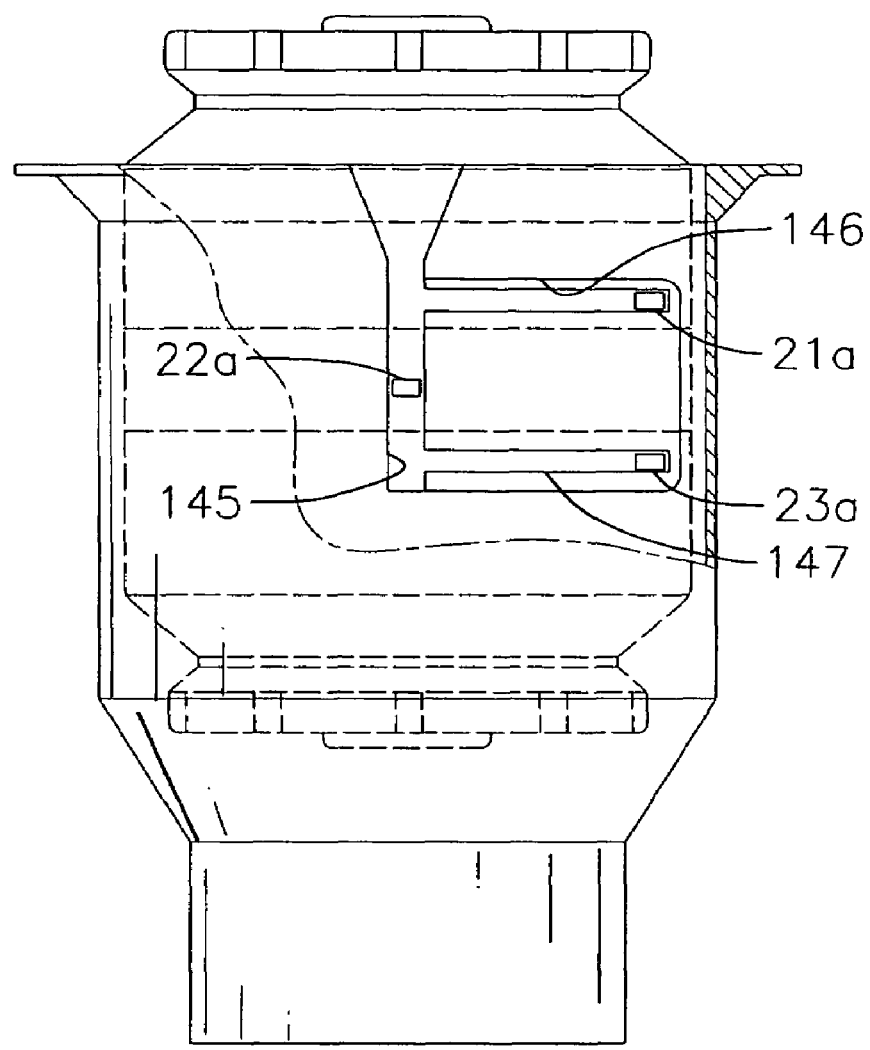

With reference to FIGS. 8A and 8B, an air pump (2') configured to mate with the embodiment shown in FIG. 6 has three secondary switches (21a,22a,23a) with the first and the last switch (21a,23a) immovable relative to the switch (22a) sandwiched therebetween. It is appreciated that when the three switches (21a,22a,23a) are aligned with one another, the air pump is at rest, however, when the switch (22a) is moved to be offset relative to the first and the last switches (21a,23a), the air pump (2') is activated.

With reference to FIGS. 9A, 9B, 9C and 9D, when an outlet (not shown) of the air pump (2') is inserted into the mounting seat (14a), the three switches (21a,22a,23a) are regulated by the groove (144) and eventually the three switches (21a,22a,23a) are received in the path (145), i.e. the air pump (2') is not activated. Then rotation of the air pump (2') will allow the first switch (21a) and the last switch (23a) to be received in the first passage (146) and the second passage (147), while the switch (22a) sandwiched between the first switch (21a) and the last switch (23a) is stopped by a periphery defining the path (145), i.e. the first switch (21a) and the last switch (23a) are offset relative to the switch (22a). Therefore, the air pump (2') starts to pump air into the inflatable object via the air nozzle of the present invention.

Figure 10:
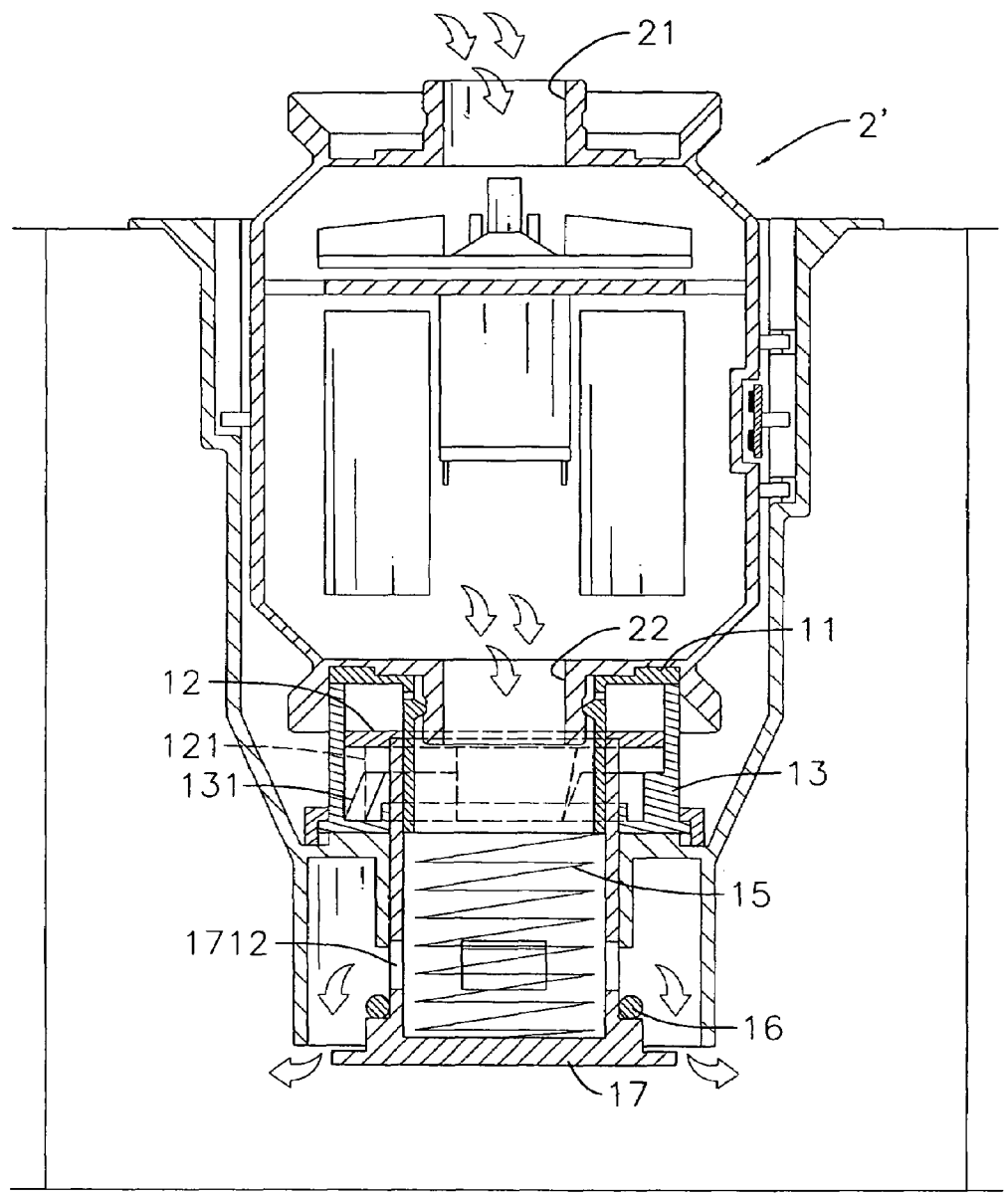
FIG. 10 is a schematic view in partial cross section showing the inflation of the air pump to the inflatable object via the air nozzle of the present invention.

With reference to FIG. 10, after the air pump (2') starts to pump air into the inflatable object via the air nozzle of the embodiment as shown in FIGS. 6 and 7, air from the inlet (21) of the air pump (2') will flow directly to the outlet (22). Then the air flowing out of the outlet (22) will flow through the rotatable collar (11), the driven sleeve (12), the rotatable cylinder (13), the mounting seat (14), the compression spring (15) and into the air holes (1712) of the sealing seat (17) and out of the air nozzle (2') of the present invention.

Figure 11:
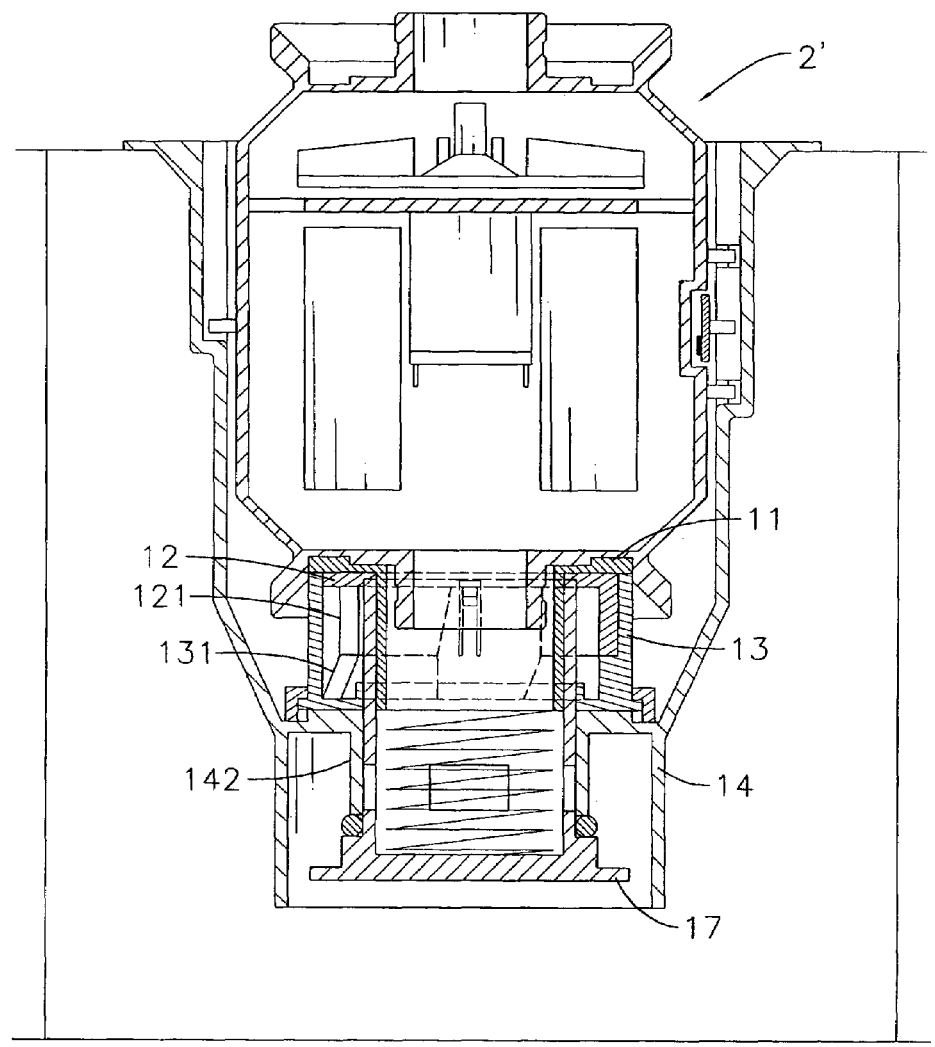
FIG. 11 is a schematic view in partial cross section showing that the sealing seat is moving upward relative to the mounting seat to seal the air channel due to the rotation of the air pump.

With reference to FIG. 11, after the inflation by the air pump (2') is finished, the operator is able to rotate the air pump (2') to re-align the three switches (21a,22a,23a) (not shown in FIG. 11) to deactivate the air pump operation. That is, the sealing seat (17) is pulled upward via the rotation of the rotatable cylinder (13) and the engagement between the second wedges (131) of the rotatable cylinder (13) and the first wedges (121) of the driven sleeve (12) to engage with the bottom peripheral edge of the tubular extension (142) of the mounting seat (14) in an airtight manner.

Figure 12A:
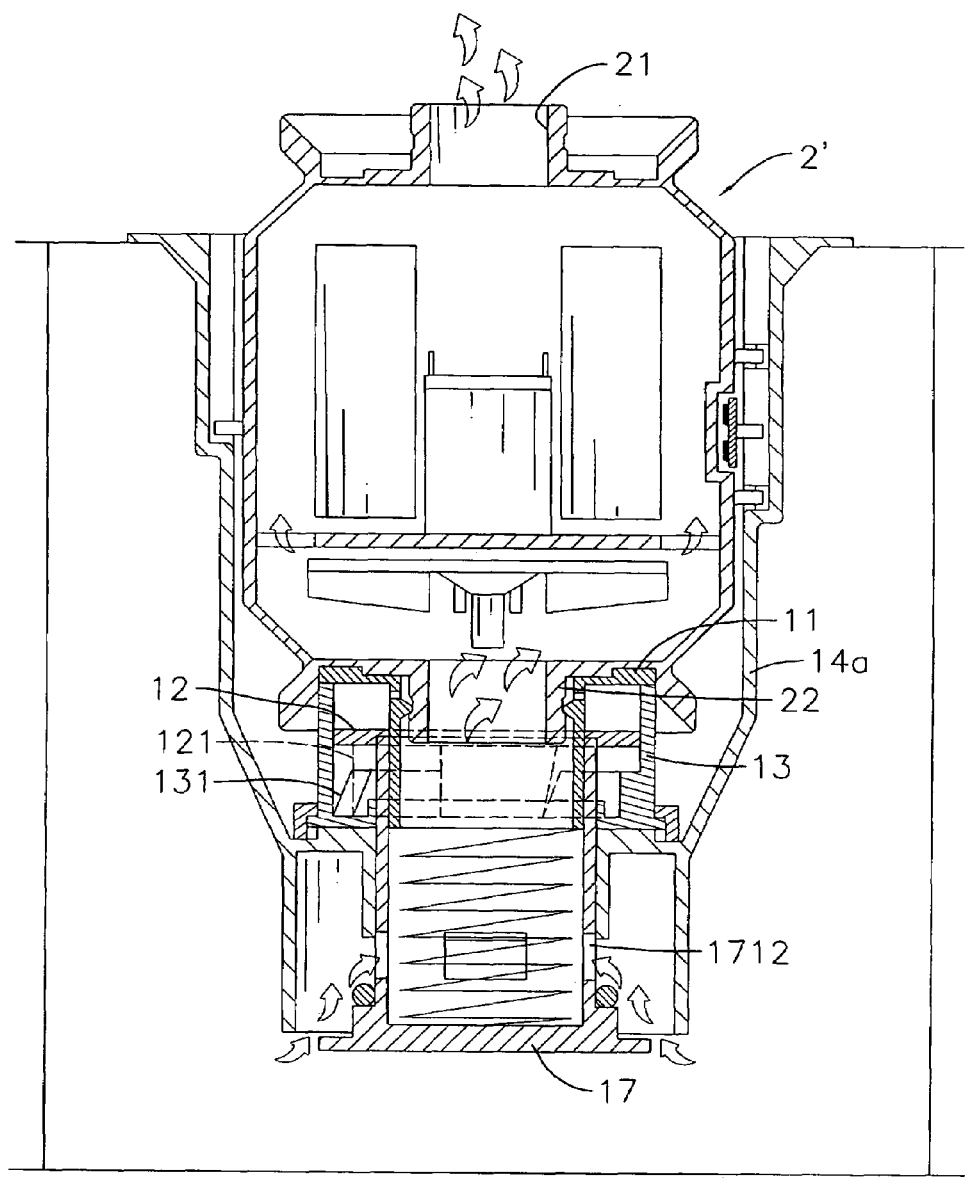
FIG. 12A is a schematic cross sectional view showing air discharge from the air nozzle due to the rotation of the air pump.
Figure 12B:
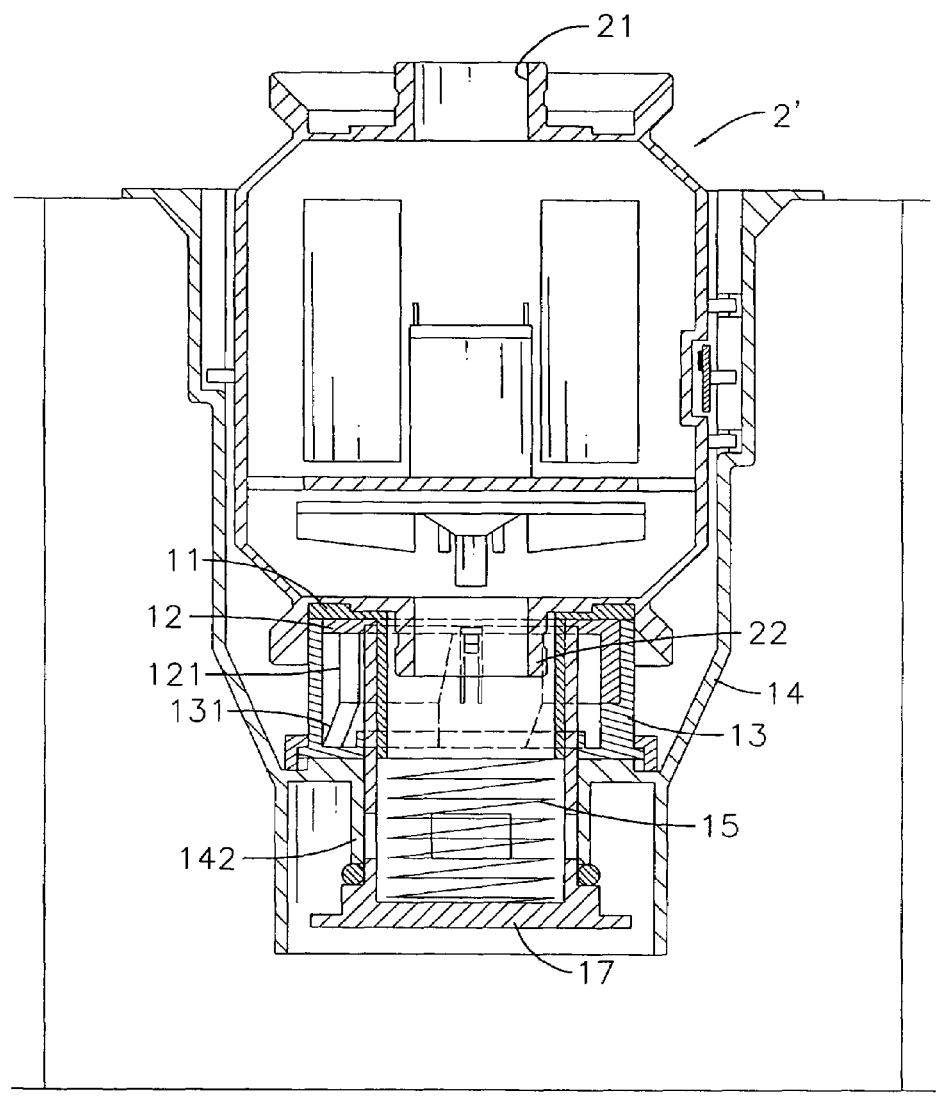
FIG. 12B is a schematic cross sectional view showing that after the air discharge process is finished, rotation of the air pump will allow the sealing seat to move upward relative to the rotatable collar to seal the air channel.

With reference to FIGS. 12A and 12B, when air discharge from the inflatable object is required, the operator inserts the outlet of the air pump (2') into the mounting seat (14a) and rotates the air pump (2') to activate the air nozzle of the present invention. Thus the air from the inflatable object flows out of the inlet (21) of the air pump (2'). When deflation is finished, the operator rotates the air pump (2') again to return the air pump (2') back to its original position, i.e. the three switches (not shown in this drawing) are in alignment with respect to one another, the air pump (2') is deactivated and the sealing seat (17) is again in engagement with the bottom peripheral edge of the tubular extension (142) of the mounting seat (14). Therefore, the air path inside the air nozzle is entirely blocked.

Figure 13A:
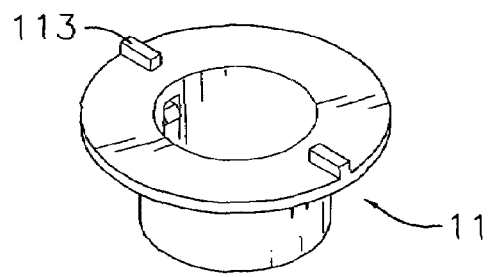
FIGS. 13A and 13B are perspective views showing alternative embodiments of the rotatable collar of the present invention.
Figure 13B:
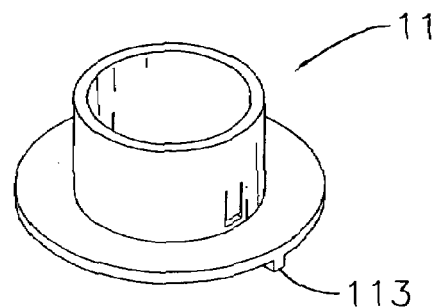
Figure 13C:
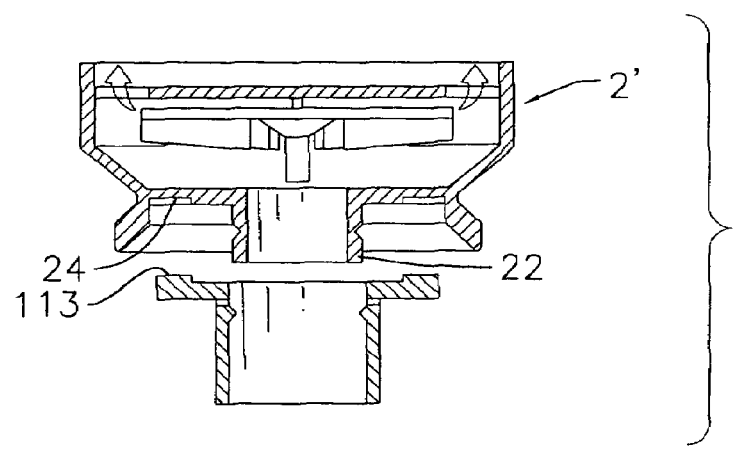
FIG. 13C is a schematic view showing the application of the rotatable collar together with the air pump.

With reference to FIGS. 13A to 13C, the embodiment shows that the rotatable collar (11) may have two opposed protrusions (113) extending out from a top face of the rotatable collar (11) to correspond to two indents (24) defined in the inner periphery of the outlet (22) of the air pump (2') so that after the protrusions (113) are received in the corresponding indents (24) of the air pump (2'), engagement between the air pump (2') and the rotatable collar (11) while the air pump (2') is driving the rotatable collar (11) is secured.

Figure 14A:
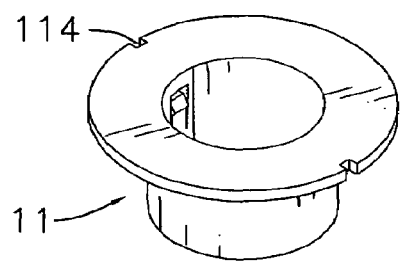
FIGS. 14A and 14B are perspective views showing alternative embodiments of the rotatable collar of the present invention.
Figure 14B:
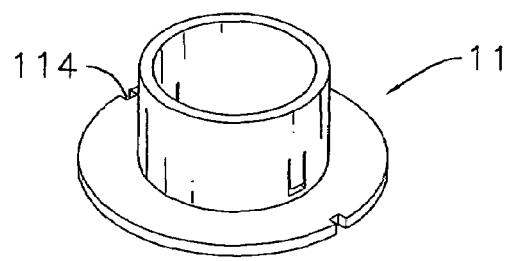
Figure 14C:
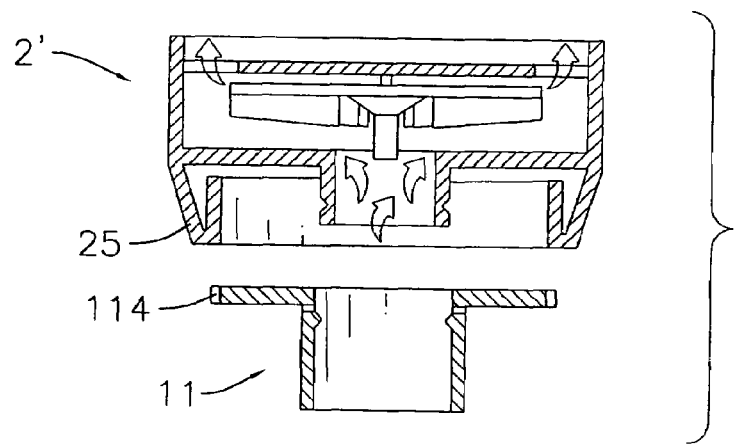
FIG. 14C is a schematic view in partial cross section showing the application of the rotatable collar together with the air pump.
Figure 15A:
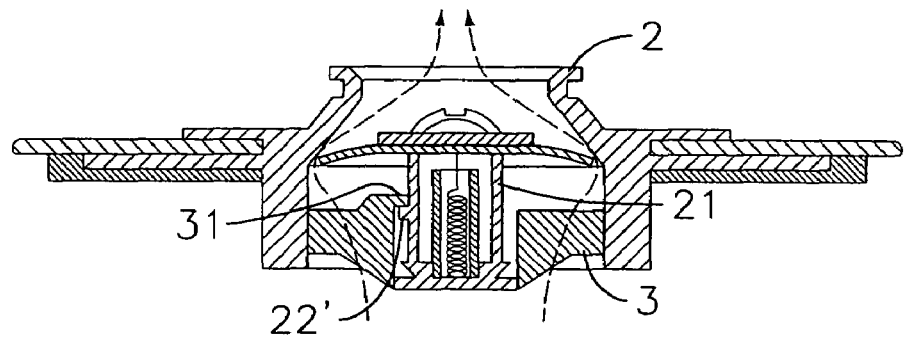
FIG. 15A is a schematic cross sectional view of a conventional air nozzle.
Figure 15B:
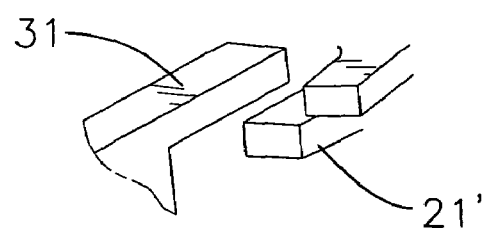
FIG. 15B is a schematic view showing the interrelationship between elements in the conventional air nozzle as shown in FIG. 15A.

With reference to FIGS. 14A to 14C, the embodiment shows that the rotatable collar (11) may have positioning recesses (114) defined in a periphery of the rotatable collar (11) and the air pump (2') may have positioning extensions (25) formed on the outlet (22) to correspond to the positioning recesses (114) of the rotatable collar (11). Therefore, after the positioning extensions (25) are received in the corresponding positioning recesses (114) of the rotatable collar (11), engagement between the air pump (2') and the rotatable collar (11) while the air pump (2') is driving the rotatable collar (11) is secured.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A self locking air nozzle for an inflatable product, the self locking air nozzle comprising:
   a mounting seat with a first through hole defined through the mounting seat;
   a sealing seat selectively moved away and toward the mounting seat;
   a driven sleeve comprising at least one first wedge formed on a bottom;
   a rotatable cylinder connected with the driven sleeve and comprising at least one second wedge formed on an inner periphery whereas the rotatable cylinder is connected with the mounting seat;
   the sealing seat driven by the rotatable cylinder so that rotation of the rotatable cylinder is able to selectively engage the sealing seat with a bottom peripheral edge of the mounting seat so as to be linearly moveable relative to the mounting seat and to selectively close the first through hole of the mounting seat.

2. The self locking air nozzle as claimed in claim 1 further comprising a rotatable collar securely connected to the rotatable cylinder and having a second through hole defined through the rotatable collar in communication with the first through hole of the mounting seat so that rotation of the rotatable collar is able to drive the rotatable cylinder to rotate.

3. The self locking air nozzle as claimed in claim 2, wherein the mounting seat has a tubular extension extending from a bottom of the mounting seat and guiding ribs formed on an inner periphery defining the first through hole to correspond to guiding recesses defined in an outer periphery of the sealing seat such that after the guiding ribs are received in the corresponding guiding recesses of the sealing seat, the sealing seat is able to move linearly relative to the mounting seat.

4. The self locking air nozzle as claimed in claim 3 further comprising a sealing ring rested on top of a first flange formed on the outer periphery of the sealing seat to be selectively engaged with the bottom peripheral edge of the mounting seat in an airtight manner.

5. The self locking air nozzle as claimed in claim 4 further comprising a fixture to secure the rotatable cylinder on the shoulder of the mounting seat.

6. The self locking air nozzle as claimed in claim 5, wherein the rotatable cylinder has a second flange formed on an outer periphery of the rotatable cylinder so that the fixture is able to mount the second flange on the shoulder of the mounting seat.

7. The self locking air nozzle as claimed in claim 6, wherein the rotatable collar has bosses formed on an inner periphery for mating with limiting recesses defined in an air pump.

8. The self locking air nozzle as claimed in claim 2 further comprising a compression spring positioned between the sealing seat and the rotatable collar to force the sealing seat to move away from the mounting seat, a shoulder formed on an inner periphery of the mounting seat to provide support to the rotatably cylinder, and a driven sleeve received in the rotatable cylinder to be linearly movable relative to the rotatable cylinder and the sealing seat driven by the rotatable cylinder to selectively block communication between the first through hole of the mounting seat and the ambient air.

9. The self locking air nozzle as claimed in claim 2, wherein the driven sleeve comprises multiple first wedges and the rotatable cylinder comprises multiple second wedges so that when the first wedges are received in gaps between two adjacent second wedges, the sealing seat is moved away from the mounting seat to communicate the air holes with the first through hole and the second through hole and when the first wedges are engaged with the second wedges, the sealing seat is moved toward the mounting seat to close the communication among the first through hole, the second through hole and the air holes.

10. The self locking air nozzle as claimed in claim 2 further comprising a compression spring positioned between the sealing seat and the driven sleeve to force the sealing seat to move away from the mounting seat.

11. The self locking air nozzle as claimed in claim 1 further comprising a compression spring positioned between the sealing seat and the driven sleeve to force the sealing seat to move away from the mounting seat.

12. The self locking air nozzle as claimed in claim 1 further comprising a compression spring positioned between the sealing seat and the driven sleeve to force the sealing seat to move away from the mounting seat, a shoulder formed on an inner periphery of the mounting seat to provide support to the rotatably cylinder, and a driven sleeve received in the rotatable cylinder to be linearly movable relative to the rotatable cylinder and sealing seat driven by the rotatable cylinder to selectively block communication between the first through hole of the mounting seat and the ambient air.

13. The self locking nozzle as claimed in claim 1, wherein the mounting seat has a groove defined in an inner periphery defining the first through hole and a path in communication with the groove, an air pump corresponding to the mounting seat has at least one switch, wherein the at least one switch is movable so that when the at least one switch is regulated by the groove in the path, the air pump is selectively activated/deactivated.

14. A self locking air nozzle comprising:
a mounting seat with a first through hole defined through the mounting seat, a shoulder formed on an inner periphery defining the first through hole and a tubular extension extending from a bottom face of the mounting seat;
a rotatable cylinder rotatably mounted on the shoulder;
a rotatable collar securely connected to the rotatable cylinder and having a second through hole in communication with the first through hole of the mounting seat so that rotation of the rotatable collar is able to drive the rotatable cylinder to rotate;
a driven sleeve received in the rotatable cylinder to be linearly movable relative to the rotatable cylinder;
a sealing seat securely connected to the driven sleeve and selectively engaged with a bottom peripheral edge of the mounting seat so as to be linearly movable relative to the mounting seat and to selectively close the first through hole of the mounting seat; and
a compression spring positioned between the sealing seat and the rotatable collar to force the sealing seat to move away from the mounting seat and;
a driving element positioned between the rotatable cylinder and the driven sleeve to selectively drive the driven sleeve to move linearly in the rotatable cylinder so that the sealing seat is moved to close communication between the first through hole of the mounting seat and air holes defined in a periphery of the sealing seat,
wherein the mounting seat has guiding ribs formed on an inner periphery defining the first through hole to correspond to guiding recesses defined in an outer periphery of the sealing seat such that after the guiding ribs are received in the corresponding guiding recesses of the sealing seat, the sealing seat is able to move linearly relative to the mounting seat.

15. The self locking air nozzle as claimed in claim 14, wherein the driving element is composed of multiple first wedges intermittently formed on a bottom of the driven sleeve and multiple second wedges intermittently formed on an inner periphery of the rotatable cylinder so that when the first wedges are received in gaps between two adjacent second wedges, the sealing seat is moved away from the mounting seat to communicate the air holes with the first through hole and the second through hole and when the first wedges are engaged with the second wedges, the sealing seat is moved toward the mounting seat to close the communication among the first through hole, the second through hole and the air holes.

16. The self locking air nozzle as claimed in claim 15, wherein a sealing ring is rested on top of a first flange formed on the outer periphery of the sealing seat to be selectively engaged with the bottom peripheral edge of the tubular extension of the mounting seat in an airtight manner.

17. The self locking air nozzle as claimed in claim 16 further comprising a fixture to secure the rotatable cylinder on the shoulder of the mounting seat.

18. The self locking air nozzle as claimed in claim 17, wherein the rotatable cylinder has a second flange formed on an outer periphery of the rotatable cylinder so that the fixture is able to mount the second flange on the shoulder of the mounting seat,
wherein the rotatable collar has bosses formed on an inner periphery for mating with limiting recesses defined in an air pump.

19. The self locking nozzle as claimed in claim 18, wherein the mounting seat has a groove defined in an inner periphery of the first through hole and a path in communication with the groove,
an air pump corresponding to the mounting seat has at least one switch, wherein the at least one switch is movable so that when the at least one switch is regulated by the groove in the path, the air pump is selectively activated/deactivated.

20. A self locking air nozzle comprising:
a mounting seat with a first through hole defined through the mounting seat;
a moveable cylinder moveably mounted on the shoulder;
a moveable collar securely connected to the moveable cylinder and having a second through hole in communication with the first through hole of the mounting seat so that movement of the moveable collar is able to drive the moveable cylinder to move;
a driven sleeve received in the moveable cylinder to be movable relative to the moveable cylinder;
a sealing seat securely connected to the driven sleeve and selectively engaged with a bottom peripheral edge of the mounting seat so as to be movable relative to the mounting seat and to selectively close the first through hole of the mounting seat; and
a driving element positioned between the moveable cylinder and the driven sleeve to selectively drive the driven sleeve to move in the moveable cylinder so that the sealing seat is moved to close communication between the first through hole of the mounting seat and the ambient air;
wherein the moveable collar remains smooth with no visual protrusion as the driven sleeve is moved to selective block or allow air flowing to/from the inflatable product.

21. The self locking air nozzle as claimed in claim 20, wherein the driving element is composed of at least one first wedges intermittently formed on a bottom of the driven sleeve and at least one second wedges intermittently formed on an inner periphery of the moveable cylinder;
so that when the peak of the first wedge on the driven sleeve is engaged with the peak of the second wedge on the moveable cylinder the sealing seat is moved toward the mounting seat to close communication between the first through hole and the ambient air; and
when the peak of the first wedge on the driven sleeve is engaged with the gap of the second wedge on the moveable cylinder the sealing seat is moved away from the mounting seat to allow communication between the first through hole and the ambient air.

22. The self locking air nozzle as claimed in claim 21 further comprising a compression spring positioned between the sealing seat and the moveable collar to force the sealing seat to move away from the mounting seat.

23. The self locking air nozzle as claimed in claim 22, wherein the mounting seat has a tubular extension extending from a bottom of the mounting seat and guiding ribs formed on an inner periphery defining the first through hole to correspond to guiding recesses defined in an outer periphery of the sealing seat such that after the guiding ribs are received in the corresponding guiding recesses of the sealing seat, the sealing seat is able to move linearly relative to the mounting seat.

24. The self locking air nozzle as claimed in claim 20, wherein the mounting seat has a groove defined in an inner periphery of the first through hole and a path in communication with the groove,
an air pump corresponding to the mounting seat has at least one switch, wherein the at least one switch is movable so that when the at least one switch is regulated by the groove in the path, the air pump is selectively activated/deactivated.

* * * * *